United States Patent
Seok

(10) Patent No.: US 10,098,150 B2
(45) Date of Patent: Oct. 9, 2018

(54) OPERATION METHOD AND APPARATUS USING SECTORIZED TRANSMISSION OPPORTUNITY IN WIRELESS LAN SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

(*) Notice: Subject to any disclaimer, the term of this patent is extended or adjusted under 35 U.S.C. 154(b) by 155 days.

(21) Appl. No.: 15/027,219

(22) PCT Filed: Jul. 4, 2014

(86) PCT No.: PCT/KR2014/006005
§ 371 (c)(1),
(2) Date: Apr. 4, 2016

(87) PCT Pub. No.: WO2015/050311
PCT Pub. Date: Apr. 9, 2015

(65) Prior Publication Data
US 2016/0242210 A1    Aug. 18, 2016

Related U.S. Application Data

(60) Provisional application No. 61/887,335, filed on Oct. 5, 2013, provisional application No. 61/887,430, filed on Oct. 6, 2013.

(51) Int. Cl.
*H04W 74/08* (2009.01)
*H04W 28/18* (2009.01)
*H04W 84/12* (2009.01)

(52) U.S. Cl.
CPC ....... *H04W 74/0808* (2013.01); *H04W 28/18* (2013.01); *H04W 84/12* (2013.01)

(58) Field of Classification Search
CPC ....... H04L 69/08; H04L 29/06; H04L 1/0025; H04L 1/0078; H04L 1/0073;
(Continued)

(56) References Cited

U.S. PATENT DOCUMENTS 7,352,770 B1 *  4/2008  Yonge, III ............... H04B 3/54
                                                 370/445
8,369,257 B2 *  2/2013  Chu ..................... H04L 12/1868
                                                 370/230
(Continued)

FOREIGN PATENT DOCUMENTS

CN    1462524    12/2003
CN    1846374    10/2006
(Continued)

OTHER PUBLICATIONS

Park, M., "Specification Framework for TGah," IEEE P802.11 Wireless LANs, IEEE 802.11-11/1137r15, May 2013, 76 pages.
(Continued)

*Primary Examiner* — Jung-Jen Liu
(74) *Attorney, Agent, or Firm* — Lee, Hong, Degerman, Kang & Waimey

(57) ABSTRACT

The present invention relates to a wireless communication system. More specifically, disclosed are an operation method and apparatus using a sectorized transmission opportunity in a wireless LAN system. The method by which a station (STA) performs a transmission opportunity-based (TXOP-based) sectorization operation in a wireless LAN system, according to one embodiment of the present invention, comprises the steps of: determining whether an ongoing frame exchange is transmitted within a basic service set (BSS) of the STA or within an overlapping BSS (OBSS); determining whether spatially orthogonal (SO) conditions are met; and resetting a virtual carrier sensing (VCS) value
(Continued)

of the STA, if the ongoing frame exchange is transmitted within the OBSS and the SO conditions are met.

8 Claims, 15 Drawing Sheets

(58) Field of Classification Search
CPC ... H04L 1/0618; H04L 1/1621; H04L 1/1671; H04L 12/403; H04L 12/4633; H04L 69/24; H04L 29/06068; H04W 48/08; H04W 74/06; H04W 28/06; H04W 28/04; H04W 52/383
See application file for complete search history.

(56) References Cited

U.S. PATENT DOCUMENTS

| | | | |
|---|---|---|---|
| 9,730,226 B2 * | 8/2017 | Seok | H04W 72/0453 |
| 9,794,829 B2 * | 10/2017 | Seok | H04W 28/06 |
| 9,807,794 B2 * | 10/2017 | Asterjadhi | H04W 74/08 |
| 2006/0041676 A1 * | 2/2006 | Sherman | H04W 74/0808 709/231 |
| 2012/0257574 A1 | 10/2012 | Seok et al. | |
| 2012/0327870 A1 * | 12/2012 | Grandhi | H04W 28/06 370/329 |
| 2013/0229996 A1 * | 9/2013 | Wang | H04W 72/0413 370/329 |
| 2015/0139116 A1 * | 5/2015 | Wang | H04B 7/0408 370/329 |
| 2016/0174206 A1 * | 6/2016 | Xia | H04B 7/0491 370/329 |

FOREIGN PATENT DOCUMENTS

| | | |
|---|---|---|
| CN | 102687570 | 9/2012 |
| EP | 1662677 | 5/2006 |
| JP | 2016524377 | 8/2016 |
| JP | 2016526856 | 9/2016 |
| KR | 10-2003-0018051 A | 3/2003 |
| KR | 10-2011-0046378 A | 5/2011 |
| WO | 2011-074761 A1 | 6/2011 |

OTHER PUBLICATIONS

Fischer, M. et al., "CID 205 BSSID Color Bits," IEEE 802.11-13/1207r1, Sep. 2013, 20 pages.
Kaiying, L. et al., "Combining Process in Virtual CS Mechanism for 802.11ah," IEEE 802.11-1310517r2, May 2013, 13 pages.
PCT International Application No. PCT/KR2014/006005, International Search Report dated Sep. 29, 2014, 15 pages.
European Patent Office Application Serial No. 14850774.2, Search Report dated May 16, 2017, 9 pages.
Wong, E. et al., "Proposed TGah Draft Amendment," IEEE Wireless LANs, doc.: IEEE 802.11-13/0500r0, XP068054010, May 2013, 330 pages.
Asai, Y. et al., "Frame Sequence of Interference Management Using Beamforming Technique in OBSS Environment," doc.: IEEE 802.11-10/0831r0, XP017676564, Jul. 2010, 30 pages.
State Intellectual Property Office of the People's Republic of China Application Serial No. 201480054908.9, Office Action dated May 31, 2018, 17 pages.
Wong, E. et al., "Proposed TGah Draft Amendment", IEEE P802.11 Wireless LANs, doc.: IEEE 802.11-13/0500r0, May 2013, 330 pages.
Asai, Y. et al., "Frame Sequence of Interference Management Using Beamforming Technique in OBSS Environment", doc.: IEEE 802.11-10/0831r0, Jul. 2010, 29 pages.

* cited by examiner

OPERATION METHOD AND APPARATUS USING SECTORIZED TRANSMISSION OPPORTUNITY IN WIRELESS LAN SYSTEM

CROSS-REFERENCE TO RELATED APPLICATIONS

This application is the National Stage filing under 35 U.S.C. 371 of International Application No. PCT/KR2014/006005, filed on Jul. 4, 2014, which claims the benefit of U.S. Provisional Application No. 61/887,335, filed on Oct. 5, 2013, and 61/887,430, filed on Oct. 6, 2013, the contents of which are all hereby incorporated by reference herein in their entirety.

TECHNICAL FIELD

The present disclosure relates to a wireless communication system and, more particularly, to an operation method and apparatus using a sectorized transmission opportunity in a wireless LAN system.

BACKGROUND ART

Various wireless communication technologies have been developed with rapid development of information technology. WLAN technology from among wireless communication technologies allows wireless Internet access at home, in enterprises or in a specific service provision region using mobile terminals, such as a Personal Digital Assistant (PDA), a laptop computer, a Portable Multimedia Player (PMP), etc. on the basis of Radio Frequency (RF) technology.

In order to overcome limited communication speed, one of the disadvantages of WLAN, recent technical standards have proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input Multiple Output (MIMO) technology has recently been applied to both a transmitter and a receiver so as to minimize transmission errors as well as to optimize a data transfer rate.

DISCLOSURE

Technical Problem

Machine-to-machine (M2M) communication technology has been discussed as a next generation communication technology. Technical standards to support M2M communications in the IEEE 802.11 WLAN system are also under development as IEEE 802.11ah. In M2M communications, a scenario of occasional communication of a small amount of data at a low speed in an environment including a large number of devices may be considered.

Communication in the wireless WAN system is performed on a medium shared by all devices. As the number of devices increases in, for example, M2M communication, a long time is taken for one device to perform channel access. Thereby, overall system performance may be degraded, and the power saving operation of each device may be hindered.

An object of the present invention devised to solve the problem lies in a method to prevent interference among devices and efficiently use channel resources and performing operations by using a sectorized transmission opportunity.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method of performing, by a station, STA, a transmission opportunity-based, TXOP-based, sectorization operation in a wireless LAN system, the method including the steps of determining whether an ongoing frame exchange is transmitted within a basic service set, BSS, of the STA or within an overlapping BSS, OBSS, determining whether spatially orthogonal, SO, conditions are met, and resetting a virtual carrier sensing, VCS, value of the STA, if the ongoing frame exchange is transmitted within the OBSS and the SO conditions are met.

In another aspect of the present invention, provided herein is a station, STA, performing opportunity-based, TXOP-based, sectorization operation in a wireless LAN system, including a transceiver, and a processor, wherein the processor determines whether an ongoing frame exchange is transmitted within a basic service set, BSS, of the STA or within an overlapping BSS, OBSS, and whether spatially orthogonal, SO, conditions are met, and reset a virtual carrier sensing, VCS, value of the STA, if the ongoing frame exchange is transmitted within the OBSS and the SO conditions are met.

Embodiments according to the above aspects of the present invention may include the following details.

The VCS of the STA may not be reset, if at least one of a condition of the ongoing frame exchange transmission within the OBSS and a condition of meeting of SO is not satisfied.

The VCS of the STA may not be reset, if the ongoing frame exchange is transmitted within the BSS even though the SO conditions are met.

The SO conditions may be met, if the STA receives omnidirectional beam but not the subsequent sectorized beam transmission.

The VCS value may correspond to NAV (Network Allocation Vector) or RID (Response Indication Deferral).

The VCS value may be configured based on information received within the ongoing frame exchange.

A channel access by the STA may be deferred according to the VCS value, if the VAS value is not reset.

Whether an ongoing frame exchange is transmitted within the BSS of the STA or within the OBSS may be determined based on partial association ID, PAID, filed which is included in uplink frame within the ongoing frame exchange.

Whether an ongoing frame exchange is transmitted within the BSS of the STA or within the OBSS may be determined based on a COLOR field value which is included in downlink frame within the ongoing frame exchange.

Resetting of the VCS value may corresponds to setting the VCS value as 0.

It is to be understood that both the foregoing general description and the following detailed description of the present invention are exemplary and explanatory and are intended to provide further explanation of the invention as claimed.

Advantageous Effects

With an operation method and apparatus using a sectorized transmission opportunity according to embodiments of the present invention, interference between devices may be prevented, and system channel resources may be more efficiently used.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
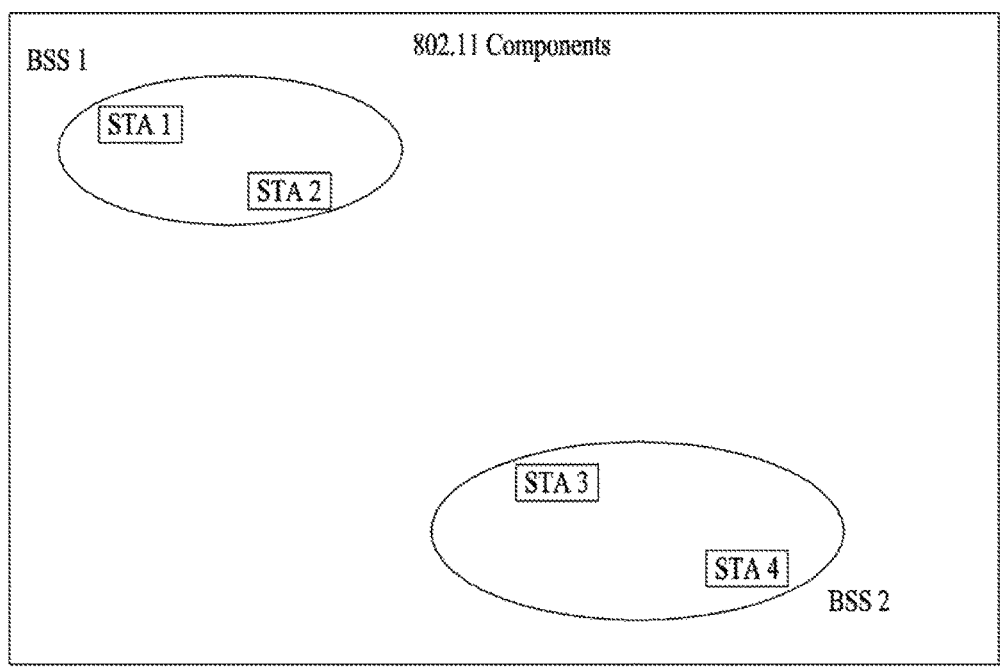
FIG. 1 is a diagram showing an exemplary structure of an IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
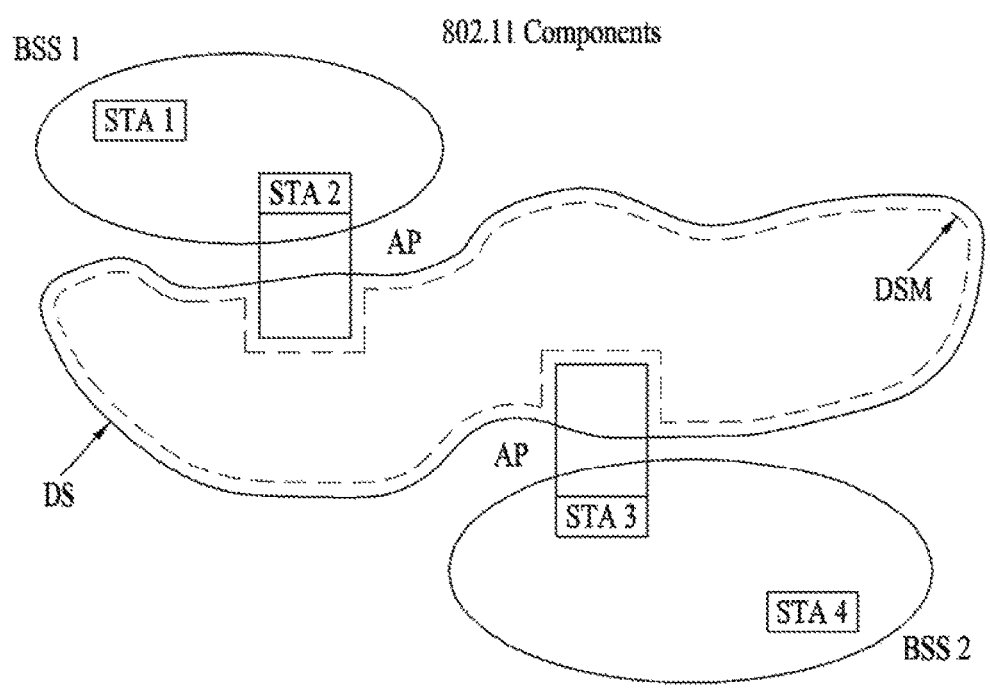
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
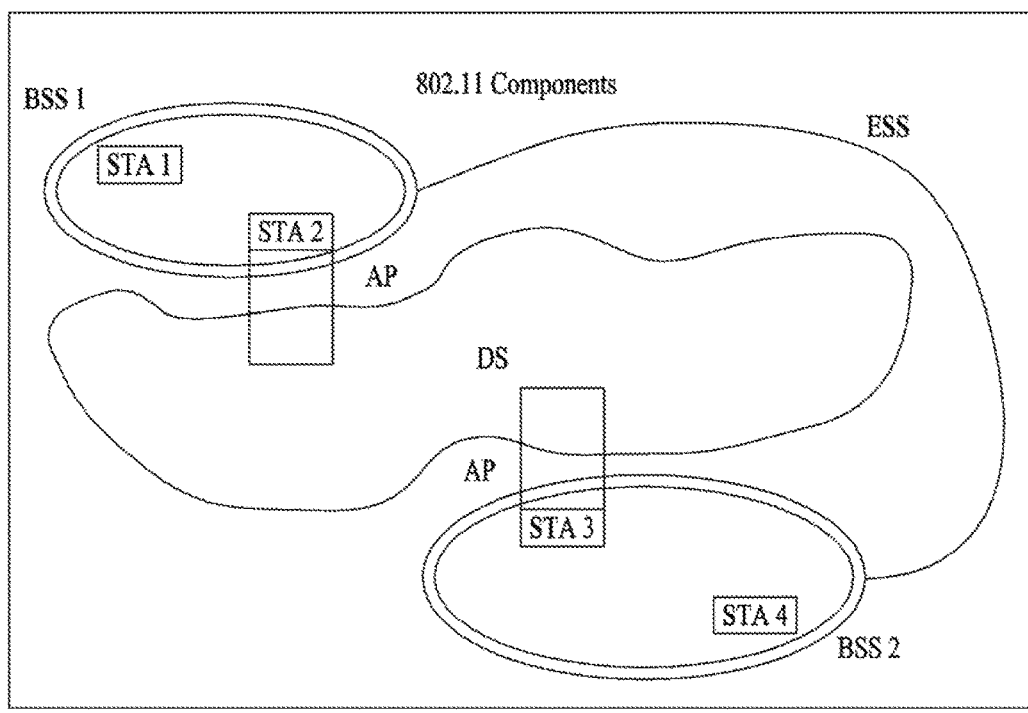
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
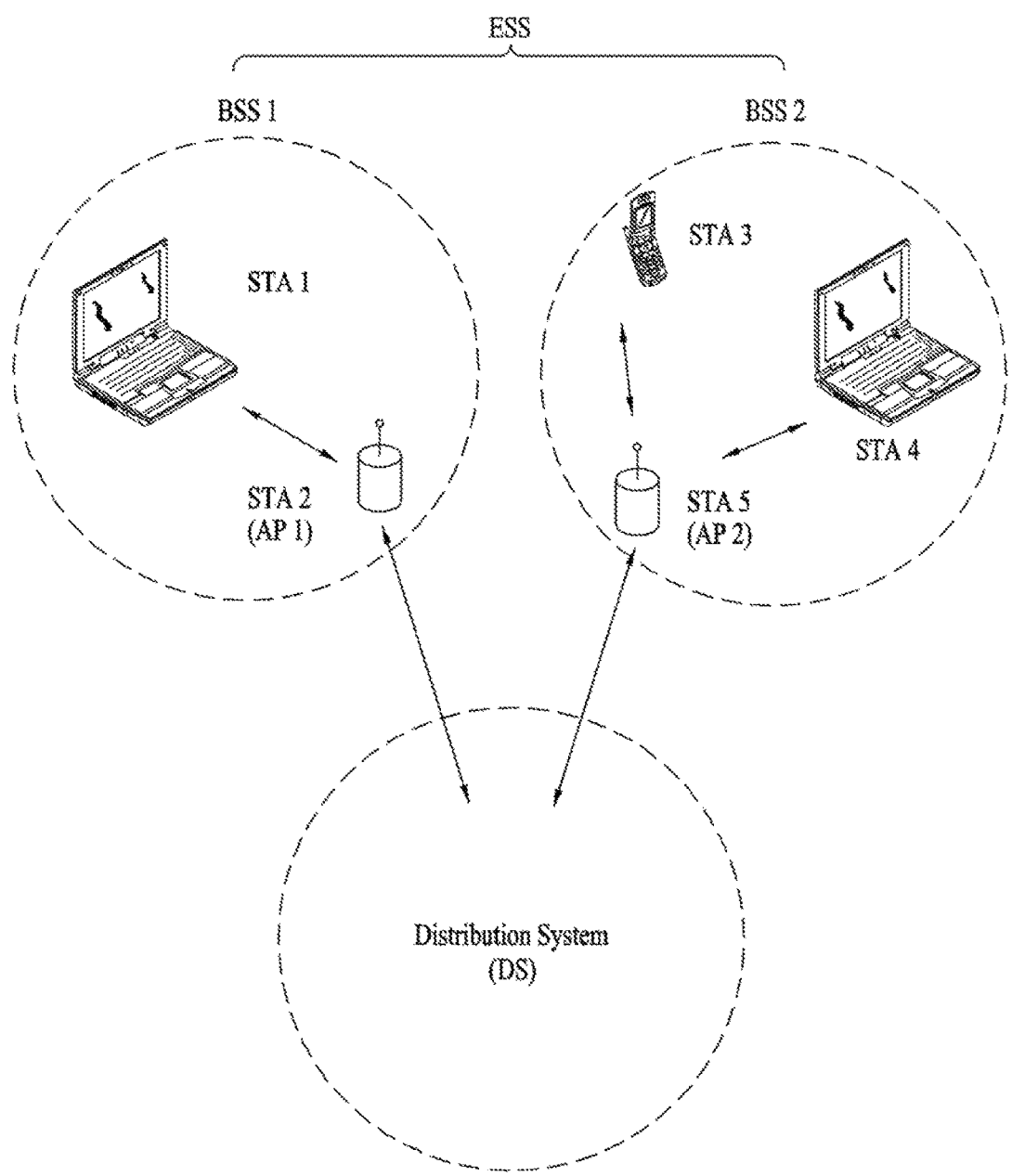
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Architecture

In the WLAN system, an operation of an AP and/or an STA may be described from the perspective of layer architecture. Layer architecture in terms of device configuration may be implemented by a processor. The AP or the STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each AP/STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. An XX-GET.request primitive is used to request the value of a given MIB attribute (management information-based attribute information). An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Link Setup Process

Figure 5:
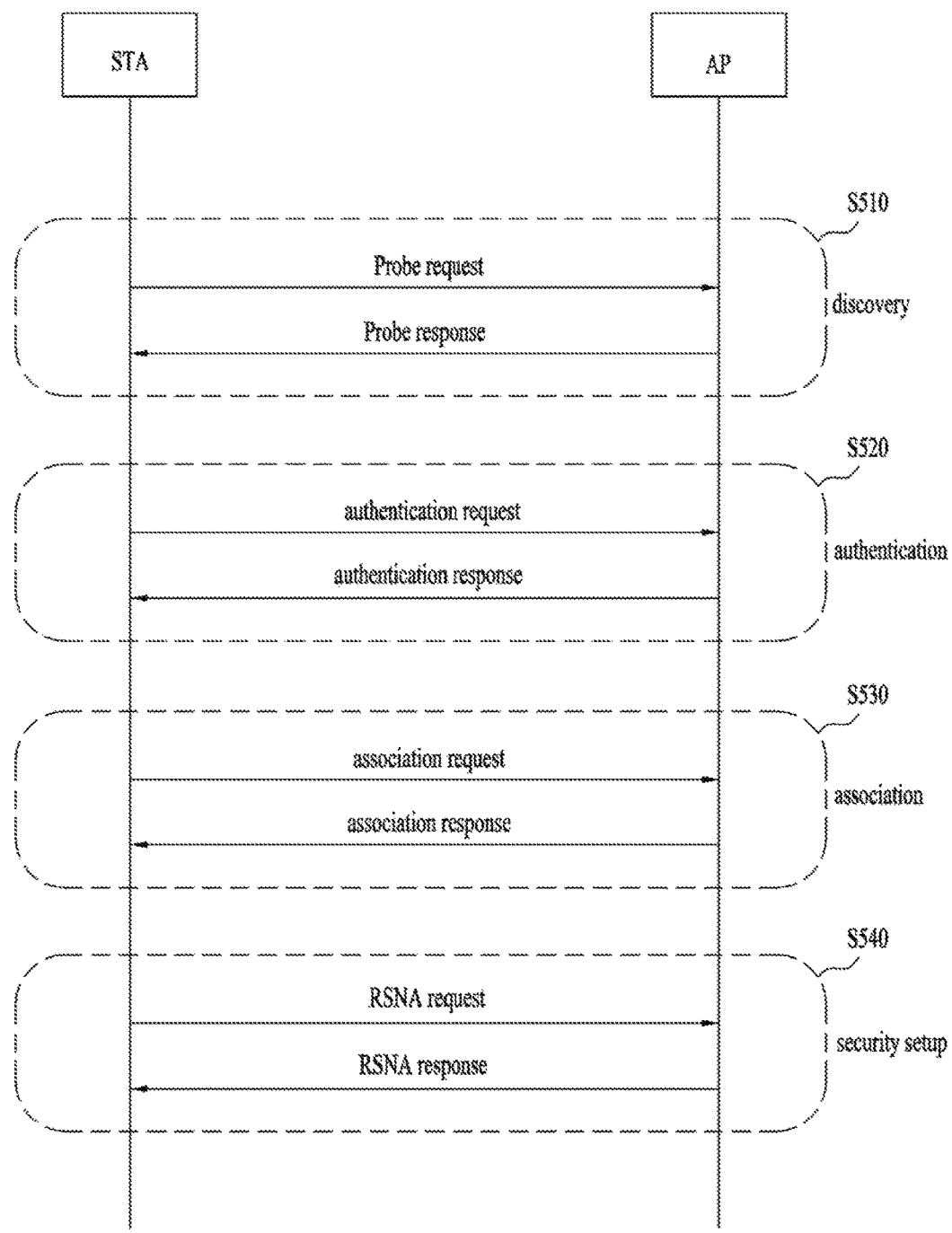
FIG. 5 illustrates a link setup process in a WLAN system.

FIG. 5 is a flowchart illustrating a general link setup process.

In order to allow an STA to set up a link with a network and transmit/receive data to/from the network, the STA should perform network discovery, authentication, association, and authentication for security. The link setup process may also be referred to as a session initiation process or a session setup process. In addition, discovery, authentication, association, and security setup steps of the link setup process may be generically referred to as an association process.

An exemplary link setup process will be described with reference to FIG. 5.

In step S510, the STA may perform network discovery. The network discovery may include scanning of the STA. That is, the STA should search for an available network so as to access the network. The STA should identify a compatible network before joining in a wireless network. The process for identifying a network in a specific region is referred to as scanning.

Scanning is classified into active scanning and passive scanning.

FIG. 5 illustrates a network discovery operation including active scanning. In the case of active scanning, the STA transmits a probe request frame and waits for a response to the probe request frame, while changing channels in order to determine an AP present around the STA. A responder transmits a probe response frame as a response to the probe request frame to the STA that has transmitted the probe request frame. The responder may be an STA that has finally transmitted a beacon frame in a BSS of the scanned channel. In a BSS, since an AP transmits a beacon frame, the AP is a responder. In a BSS, since STAs of the IBSS sequentially transmit beacon frames, the responder is not constant. For example, the STA, which has transmitted a probe request frame on Channel #1 and has received a probe response frame on Channel #1, may store BSS-related information included in the received probe response frame, move to the next channel (for example, Channel #2), and perform scanning on the next channel in the same manner (i.e., probe request/response transmission/reception on Channel #2).

Although not illustrated in FIG. 5, the scan operation may also be carried out by passive scanning. An STA that performs passive scanning waits for a beacon frame, while moving from one channel to another channel. The beacon frame is one of management frames in IEEE 802.11, indicates the presence of a wireless network, enables the STA performing scanning to search for the wireless network, and is periodically transmitted in such a manner that the STA may join in the wireless network. In a BSS, an AP periodically transmits a beacon frame. In an IBSS, STAs of the IBSS sequentially transmit beacon frames. Upon receipt of a beacon frame during scanning, an STA stores BSS information included in the beacon frame, moves to another channel, and records beacon frame information for each channel. Upon receipt of a beacon frame, an STA stores BSS-related information included in the received beacon frame, moves to the next channel, and performs scanning on the next channel in the same manner.

In comparison between active scanning and passive scanning, active scanning advantageously has a shorter delay and less power consumption than passive scanning.

After the STA discovers the network, the STA may perform an authentication process in step S520. The authentication process may be referred to as a first authentication process to clearly distinguish the authentication process from a security setup process of step S540.

The authentication process may include transmission of an authentication request frame to an AP by the STA, and transmission of an authentication response frame to the STA by the AP in response to the authentication request frame. The authentication frame used for an authentication request/response may be a management frame.

An authentication frame may include an authentication algorithm number, an authentication transaction sequence number, a status code, challenge text, a Robust Security Network (RSN), a Finite Cyclic Group (FCG), etc. The above-mentioned information included in the authentication request/response frame may be an example of part of information that may be included in the authentication request/response frame, may be replaced with other information, or may include additional information.

The STA may transmit the authentication request frame to the AP. The AP may determine whether to authenticate the STA based on information included in the received authentication request frame. The AP may provide the result of the authentication process to the STA in the authentication response frame.

After the STA is successfully authenticated, the association process may be carried out in step S530. The association process may involve transmitting an association request frame to the AP by the STA, and transmitting an association response frame to the STA by the AP in response to the association request frame.

For example, the association request frame may include information related to various capabilities, a beacon listen interval, a Service Set Identifier (SSID), supported rates, supported channels, an RSN, a mobility domain, supported operating classes, a Traffic Indication Map (TIM) broadcast request, interworking service capability, etc.

For example, the association response frame may include information related to various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information may be an example of part of information that may be included in the association request/response frame, may be replaced with other information, or may include additional information.

After the STA is successfully associated with the network, a security setup process may be carried out in step S540. The security setup process of step S540 may be referred to as an authentication process based on a Robust Security Network Association (RSNA) request/response. The authentication process of step S520 may be referred to as the first authentication process, and the security setup process of step S540 may also be simply referred to as an authentication process.

For example, the security setup process of step S540 may include a private key setup process through 4-way handshaking based on an (Extensible Authentication Protocol over LAN (EAPOL) frame. In addition, the security setup process may also be carried out in a security scheme that has not been defined in the IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on multiple input and multiple output (MIMO) technology in which multiple antennas are used at both a transmitter and a receiver.

With widespread use of the WLAN technology and diversification of WLAN applications, there has been a need for development a new WLAN system capable of supporting higher HT than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at an MAC service access point (MAC SAP).

In order to efficiently utilize a radio frequency channel, the next generation WLAN system supports a Multi User Multiple Input Multiple Output (MU-MIMO) transmission scheme in which a plurality of STAs are allowed to access a channel simultaneously. In accordance with the MU-MIMO transmission scheme, the AP may simultaneously transmit packets to at least one MIMO-paired STA.

In addition, a technology for supporting WLAN system operations in whitespace is under discussion. For example, introduction of the WLAN system in TV whitespace (TV WS) such as a frequency band (e.g., a band between 54 MHz and 698 MHz) left idle due to transition from analog TV to digital TV is under discussion in the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation so as to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame if the licensed user uses this frequency band.

Accordingly, the AP and/or STA needs to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or a DTV preamble is detected.

Machine-to-machine (M2M) communication technology is under discussion as a next generation communication technology. Technical standard IEEE 802.11ah for supporting M2M communication in the IEEE 802.11 WLAN system is also under development. M2M communication, which represents a communication scheme involving one or more machines, may be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user devices such as a smartphone which is capable of performing communication by automatically accessing the network without manipulation/intervention by the user may be an example of the machines. M2M communication may include device-to-device (D2D) communication and communication between a device and an application server. Examples of communication between a device and an application server may include communication between a vending machine and a server, communication between a Point of Sale (POS) device and a server, and communication between an electric meter, a gas meter or a water meter and a server. Additionally, M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). In addition, in M2M communication, operations of STAs are performed according to commands provided on downlink (i.e., a link from an AP to a non-AP STA), and data obtained as a result is reported on uplink (i.e., a link from the non-AP STA to the AP). Accordingly, in the case of M2M communication, the main focus is on an improved communication scheme on uplink on which main data is transmitted. In addition, an M2M STA is mainly operated by a battery, but it is often difficult for a user to frequently charge the M2M STA. For this reason, it is necessary to minimize battery consumption to ensure a long service life for the M2M STA. Moreover, as it is expected that there will be a specific situation in which it is difficult for a user to directly manipulate the M2M STA, the M2M STA is required to have a function of self-recovery. In this context, there have been discussions about methods to efficiently support a situation in which a very small number of STAs have a data frame to receive from the AP during one beacon period while the number of STAs to be associated with one AP increases in the WLAN system and methods to reduce power consumption of STAs.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

WLAN Operating at Sub-1 GHz

As described above, the IEEE 802.11ah standard providing M2M communication as a use case has recently been discussed. IEEE 802.11ah is operated in an unlicensed band other than a TV whitespace band at a sub-1 GHz (S1G) operation frequency, and has a wider coverage (e.g., a maximum of 1 km) than the legacy WLAN, which mainly supports a conventional indoor coverage. That is, in contrast with the legacy WLAN operated at a frequency of 2.4 GHz or 5 GHz, if a WLAN is operated at an operation frequency of sub-1 GHz (e.g., 700-900 MHz), the coverage of the AP is increased by about two or three times at the same transmit (Tx) power due to characteristics of radio waves in the corresponding band. In this case, a large number of STAs may be connected per AP. Use cases considered in IEEE 802.11ah may be summarized as shown in Table 1 below.

TABLE 1

Use Case 1: Sensors and meters
    1a: Smart Grid - Meter to Pole
    1c: Environmental/Agricultural Monitoring
    1d: Industrial process sensors
    1e: Healthcare
    1f: Healthcare
    1g: Home/Building Automation
    1h: Home sensors
Use Case 2: Backhaul Sensor and meter data
    Backhaul aggregation of sensors
    Backhaul aggregation of industrial sensors
Use Case 3: Extended range Wi-Fi
    Outdoor extended range hotspot
    Outdoor Wi-Fi for cellular traffic offloading In accordance with Use Case 1 of Table 1, various kinds of sensors/meter devices may be connected to an 802.11ah AP to perform M2M communication. Specifically, smart grid technology enables a maximum of 6000 sensors/meter devices to be connected to one AP.

In accordance with Use Case 2 of Table 1, an 802.11ah AP configured to provide a large coverage serves as a backhaul link of other systems such as IEEE 802.15.4g.

In accordance with Use Case 3 of Table 1, extended home coverage communication, campus wide coverage communication, and outdoor extended range hotspot communication such as shopping-mall range hotspot communication may be supported. In accordance with Use Case 3, an 802.11ah AP may support traffic offloading of cellular mobile communication, thereby serving to mitigate cellular traffic overload.

A physical layer (PHY) for sub-1 GHz communication may be implemented by performing $1/10$ down-clocking of the legacy IEEE 802.11ac PHY. In this case, the channel bandwidths of 2/4/8/16/8+8 MHz may be provided in a sub-1 GHz band by applying $1/10$ down-clocking to the channel bandwidths of 20/40/80/160/80+80 MHz for use in 802.11ac. Thereby, a guard interval (GI) is increased by 10 times from 0.8 μs to 8 μs. Table 2 below shows a result of comparison between 802.11ac PHY throughput and $1/10$ down-clocked sub-1 GHz PHY throughput.

TABLE 2

| IEEE 802.11ac PHY Channel Bandwidth/Throughput | 1/10 down-clocked sub-1 GHz PHY Channel Bandwidth/Throughput |
| --- | --- |
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS), prior to data transmission. When it is determined in the sensing that the medium is in the idle state, frame transmission begins through the medium. On the other hand, when it is sensed that the medium is in the busy state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). The HCF is based on the DCF and the point coordination function (PCF). The PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
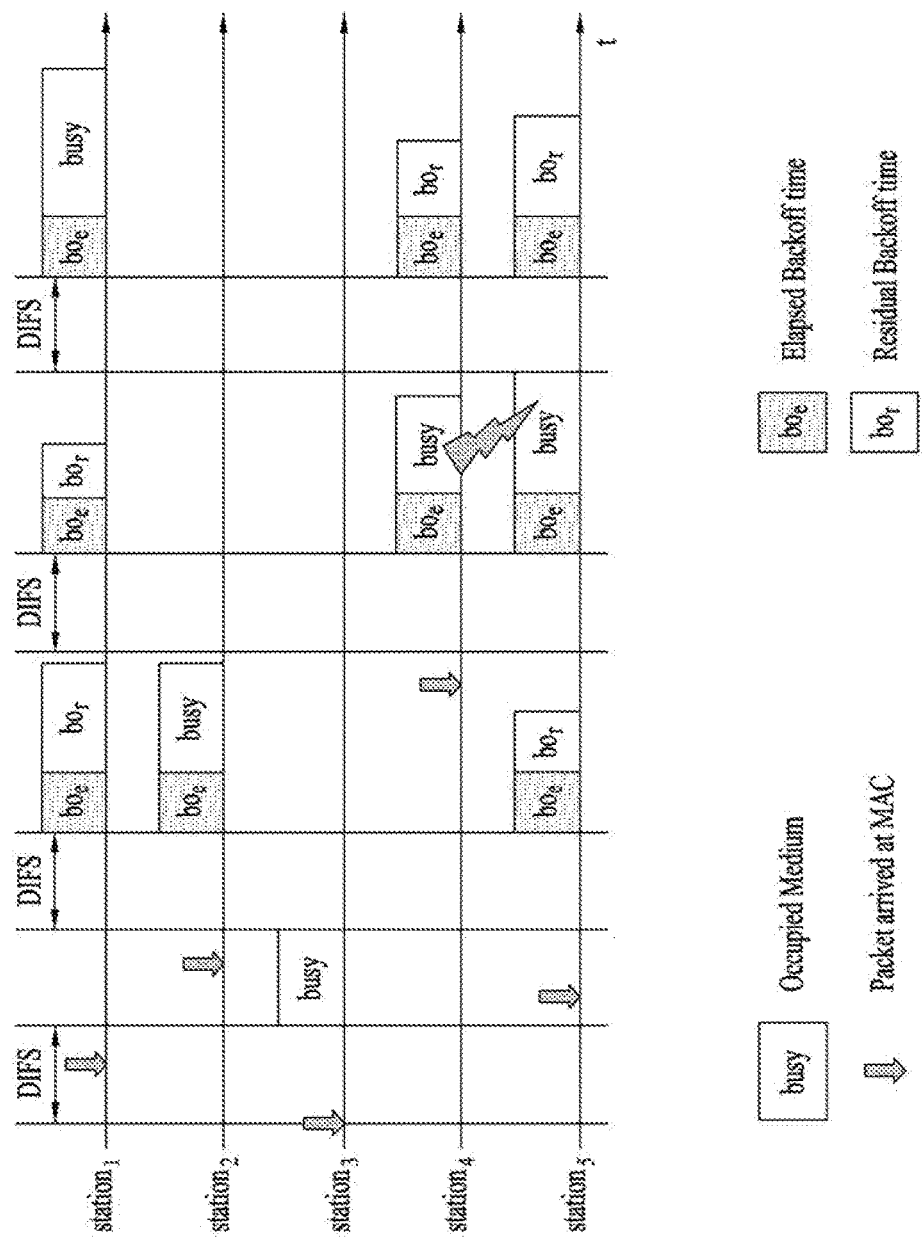
FIG. 6 illustrates a backoff process.

FIG. 6 illustrates a backoff process.

Hereinafter, operations based on a random backoff period will be described with reference to FIG. 6. If a medium is switched from the busy or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin Preferably, the values of CW, CWmin, and CWmax are set to $2^n-1$ (where n=0, 1, 2, ... ).

Once the random backoff process begins, the STA continuously monitors the medium while counting down the backoff slot according to a determined backoff count value. If the medium is monitored as being in the busy state, the STA stops countdown and waits for a predetermined time. If the medium is in the idle state, the remaining countdown restarts.

In the example shown in FIG. 6, if a packet for STA3 to transmit reaches MAC of STA3, the STA3 may confirm that the medium is in the idle state in the DIFS and immediately transmit a frame. In the meantime, the remaining STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the least backoff count value and STA1 selects the greatest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, none of STA4 and STA5 receives ACK, and accordingly data transmission fails. In this case, each of STA4 and STA5 may double the CW value, select a random backoff count value and then perform countdown. Meanwhile, STA1 waits while the medium is in the busy state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only a physical carrier sensing through which the AP and/or STA directly sense the medium, but also virtual carrier sensing. The virtual carrier sensing is performed to address some problems (such as a hidden node problem) encountered in the medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period during which the medium is used by the AP and/or STA to transmit a frame. An STA having received the NAV value may be prohibited from or deferred in performing medium access (general access) during the corresponding period. For example, NAV may be set according to the value of the Duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
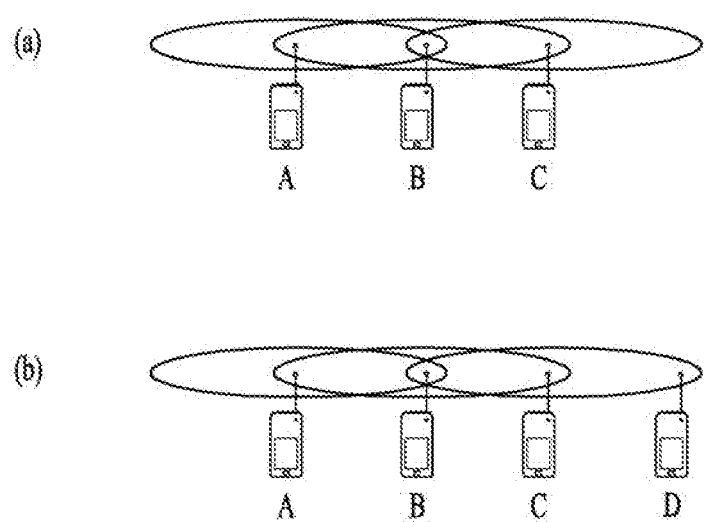
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, STA C may determine that the medium is in the idle state in performing carrier sensing prior to transmission of data to STA B, even in a situation in which STA A is transmitting information to STA B. This is because transmission by STA A (i.e., busy medium) may not be sensed at the location of STA C. In this case, collision may occur since STA B receives information of STA A and information of STA C simultaneously. In this case, STA A may be considered a hidden node of STA C.

FIG. 7(b) exemplarily shows an exposed node. In this example, STA C has information to be transmitted to STA D in a situation in which STA B is transmitting data to STA A. In this case, STA C may perform carrier sensing and determine that the medium is busy due to transmission of STA B. Therefore, although STA C has information to be transmitted to STA D, STA C should wait until the medium returns to the idle state since the busy state of the medium is sensed. However, since STA A is actually positioned outside the transmission range of STA C, transmission from STA C may not collide with transmission from STA B in view of STA A, and STA C is unnecessarily waiting until STA B stops transmission. In this case, STA C may be viewed as an exposed node of STA B.

Figure 8:
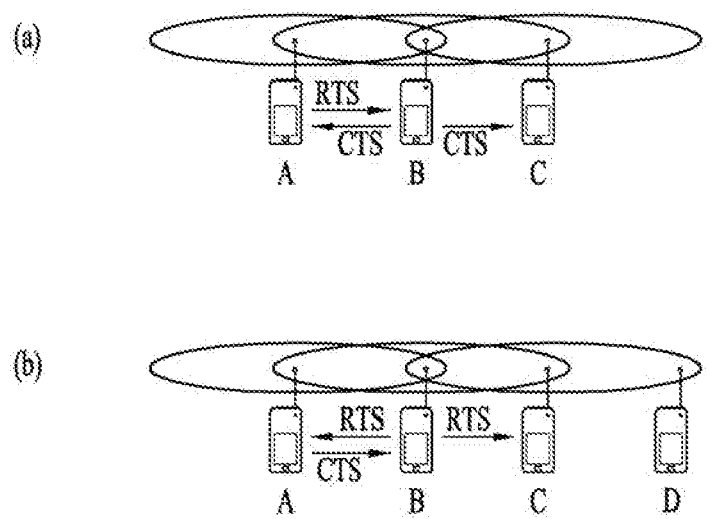
FIG. 8 illustrates RTS and CTS.

FIG. 8 illustrates RTS and CTS.

Figure 13:
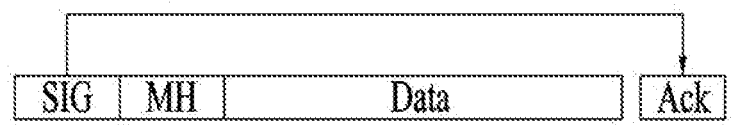
FIG. 13 is a diagram illustrating a VCS scheme using a Response Indication field.

In order to efficiently utilize the collision avoidance mechanism in an exemplary situation as shown in FIG. 13, short signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA to receive data, the STA to receive data may transmit the CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located outside the carrier sensing range of STA C.

TXOP Truncation

Once an STA which is allowed to access a channel using EDCA empties a transmission queue, the STA may transmit a contention free (CF)-END frame if the remaining time interval is sufficient to transmit the frame. By transmitting the CF-END frame, the STA may explicitly indicate that the transmission opportunity (TXOP) thereof has expired. Herein, the TXOP is defined as a time interval in which a specific STA has a right to initiate frame exchange on a radio medium and may be configured by start timing and a maximum duration value.

A TXOP holder transmitting a CF-END frame should not initiate an additional frame exchange sequence within the current TXOP.

Non-AP STAs other than the TXOP holder should not transmit a CF-END frame.

An STA receiving the CF-END frame interprets the frame as NAV reset. That is, the STA may reset the NAV timer to 0 when the data unit (e.g., PPDU) containing the CF-END frame is terminated.

If the AP receives a CF-END frame having a BSSID coinciding with the BSSID thereof, the AP may respond to the frame by transmitting a CF-END frame after a short inter-frame space (SIFS).

Transmission of a single CF-END frame from the TXOP holder may reset the NAV of an STA which is capable of hearing transmission of the TXOP holder. There may be STAs which cannot hear a CF-END frame causing the NAV to be reset, but may hear transmission of a TXOP responder which resets the NAV (e.g., a hidden node situation). These STAs are prohibited from performing contention over the medium until the original NAV reservation expires.

PPDU Frame Format

A PPDU (Physical Layer Convergence Protocol (PLCP) Packet Data Unit) frame format may include an STF (Short Training Field), an LTF (Long Training Field), an SIG (SIGNAL) field, and a Data field. The most basic PPDU frame format (e.g., a non-HT (High Throughput) PPDU frame format) may consist of an L-STF (Legacy-STF), an L-LTF (Legacy-LTF), an SIG field, and a Data field. In addition, depending on the type of a PPDU frame format (e.g., an HT-mixed format PPDU, an HT-greenfield format PPDU, a VHT (Very High Throughput) PPDU, etc.), an additional (or another type) STF, an LTF, and an SIG field may be included between the SIG field and the Data field.

The STF is a signal for signal detection, automatic gain control (AGC), diversity selection, precise time synchronization, and the like, and the LTF is a signal for channel estimation, frequency error estimation, and the like. The combination of the STF and the LTF may be referred to as a PLCP preamble. The PLCP preamble may be viewed as a signal for channel estimation and synchronization of an OFDM physical layer.

The SIG field may include a RATE field and a LENGTH field. The RATE field may contain information about data demodulation and coding rate. The LENGTH field may contain information about the length of data. Additionally, the SIG field may include a parity bit and an SIG TAIL bit.

The Data field may include a SERVICE field, a PSDU (PLCP Service Data Unit), a PPDU TAIL bit. When necessary, the Data field may also include a padding bit. Some bits of the SERVICE field may be used to synchronize a descrambler of a receiver. The PSDU corresponds to a MAC PDU defined in the MAC layer, and may contain data produced/used in a higher layer. The PPDU TAIL bit may be used to return the state of an encoder set to 0. The padding bit may be used to adjust the length of the data field in a predetermined unit.

The MAC PDU is defined according to various MAC frame formats. A basic MAC frame includes MAC header, a frame body, and a frame check sequence (FCS). The MAC frame may be configured in a MAC PDU and transmitted/received through the PSDU of the data part of the PPDU frame format.

Meanwhile, the null-data packet (NDP) frame format refers to a frame format that does not contain a data packet. That is, the NDP frame generally refers to a frame format that includes only the PLCP header portion (i.e., STF, LTF and SIG fields) of the typical PPDU format, and does not include the other portion of the PPDU format (i.e., the Data field). The NDP frame may be referred to as a short frame format.

Single-User/Multi-User Frame Structure

The present invention proposes a method for configuring an SIG field in a single-user (SU) frame and a multiple-user (MU) frame in a wireless LAN system operating in a sub-1 GHz frequency band (e.g., a band from 902 MHz to 928 MHz). The SU frame may be used for SU-MIMO, and the MU frame may be used for MU-MIMO. In the description below, a frame may be a data frame or an NDP frame.

Figure 9:
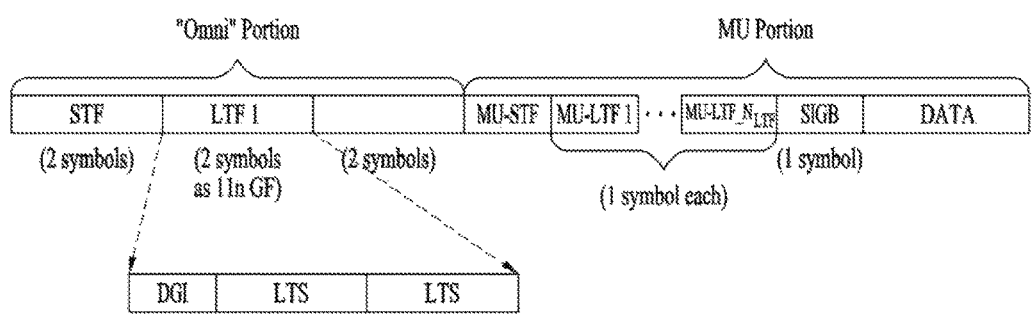
FIG. 9 illustrates an exemplary SU/MU frame format.

FIG. 9 illustrates an exemplary SU/MU frame format.

In the example of FIG. 9, STF, LTF1, and SIG-A (SIGNAL A) fields may correspond to an Omni portion in a sense that the fields are omnidirectionally transmitted to all STAs. These fields may be transmitted without being subjected to beamforming or precoding. As illustrated in FIG. 9, the SU/MU frame format corresponds to a non-NDP frame format.

The MU-STF, MU-LTF1, . . . , MU-LTF_$N_{LTF}$, and SIG-B (SIGNAL B) fields following the SIG-A field may be user-specifically transmitted by applying beamforming or precoding thereto. In the exemplary frame format of FIG. 9, the MU portion may include MU-STF, MU-LTF(s), SIG-B and DATA fields.

The STF, LTF1 and SIG-A fields in the Omni portion may be transmitted in a single stream for each subcarrier, which may be expressed by the following equation.

$$[X_k]_{N_{TX} \times 1} = [Q_k]_{N_{TX} \times 1} d_k \qquad \text{Equation 1}$$

In Equation 1, k denotes a subcarrier (or tone) index, $x_k$ denotes a signal transmitted on subcarrier k, and $N_{TX}$ denotes the number of Tx antennas. $Q_k$ denotes a column vector for encoding (e.g., spatial-mapping) a signal transmitted on subcarrier k, and $d_k$ denotes data input to the encoder. In Equation 1, cyclic shift delay (CSD) in the time domain may be applied to $Q_k$. CSD in the time domain means phase rotation or phase shift in the frequency domain. Accordingly, $Q_k$ may contain a phase shift value on tone k resulting from the time-domain CSD.

If the frame format illustrated in FIG. 9 is employed, all STAs may receive the STF, LTF1, and SIG-A fields, and each of STAs may decode the SIG-A field through channel estimation based on the STF and LTF1.

The SIG-A field may contain information about the length/duration, channel bandwidth, and the number of spatial streams. The SIG-A field has a length of 2 OFDM symbols. Since one OFDM symbol uses binary phase shift keying (BPSK) modulation, one OFDM symbol may contain 24 bits of information. Accordingly, the SIG-A field may contain 48 bits of information.

Table 3 given below shows an example of bit assignment in the SIG-A field for SU and MU.

TABLE 3

|  | SU | MU |
| --- | --- | --- |
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| Response Indication | 2 | 2 |
| Reserved | 3 | 3 |
| CRC | 4 | 4 |
| Tail | 6 | 6 |
| Total | 48 | 48 |

In Table 3, the SU/MU Indication field is used to distinguish between the SU frame format and the MU frame format.

The Length/Duration field indicates the number of OFDM symbols (i.e., a duration) or bytes (i.e., a length). In the SU frame, if the value of the Aggregation field is 1, the Length/Duration field is interpreted as a Duration field. If the value of the Aggregation field is 0, the Length/Duration field is interpreted as a Length field. In the MU frame, aggregation is constantly applied without definition of the Aggregation field, and thus the Length/Duration field is interpreted as a Duration field.

The MCS field indicates a modulation and coding technique used in performing PSDU transmission. The MCS field is transmitted through the SIG-A field only for the SU frame. If other STAs (i.e., third-party STAs which are not directly related to transmission and reception between two STAs) receive the SU frame, the duration of a currently received SU frame (i.e., a frame which has the Aggregation field set to 0 and is SU-beamformed) may be calculated based on the length value of the Length/Duration field and the value of the MCS field. For the MU frame, the MCS field is not included in the SIG-A field, but is included in the SIG-B field, which carries user-specific information. Thereby, MCS is independently applicable for each UE.

The BW field indicates the channel bandwidth of a transmitted SU frame or MU frame. For example, the BW field may be set to a value indicating one of 2 MHz, 4 MHz, 8 MHz, 16 MHz and 8+8 MHz.

The Aggregation field indicates whether the PSDU is aggregated in the form of an aggregation MPDU (A-MPDU). If the Aggregation field is set to 1, this means that the PSDU is transmitted by being aggregated in the form of an A-MPDU. If the Aggregation field is 0, this means that the PSDU is transmitted without being aggregated. For the MU frame, the PSDU is always transmitted in the form of an A-MPDU, and accordingly the Aggregation field is not included in the SIG-A field as the field need not be signaled.

The Space-Time Block Coding (STBC) field indicates whether STBC is applied to the SU frame or the MU frame.

The Coding field indicates a coding technique used for the SU frame or the MU frame. For the SU frame, a coding technique such as Binary Convolutional Code (BCC) and Low Density Parity Check (LDPC) may be used. For the MU frame, a coding technique is independently applicable for each user, and thus the Coding field may be defined in two or more bits to support independent application of the coding technique.

The Short Guard Interval (SGI) field indicates whether a short GI is used for transmission of the PSDU of the SU frame or MU frame. For the MU frame, if an SGI is used, the field may indicate that the SGI is commonly applied to all users belonging to an MU-MIMO group.

The Group ID (GID) field indicates multi-user group information in the MU frame. For the SU frame, the user group need not be defined, and thus the GID field is not included in the SIG-A field.

The Nsts (the number of space-time streams) field indicates the number of spatial streams in the SU frame or the MU frame. For the MU frame, the field indicates the number of spatial streams for each of the STAs belonging to a corresponding MU group. To this end, 8 bits are needed. Specifically, one MU group may include a maximum of 4 users, and a maximum of 4 spatial streams per user may be transmitted, and thus 8 bits are needed to correctly support transmission.

The Partial AID (PAID) field indicates an STA ID for identifying a reception STA in the SU frame. In the uplink frame, the value of PAID is configured by a part of BSSID (Basic Service Set ID). In the downlink frame, the value of PAID may be configured as a result of hashing of the BSSID of the AP and the AID of an STA. For example, the BSSID corresponds to the MAC address of the AP and has a length of 48 bits. The AID, which has a length of 16 bits, is identification information or an address that the AP assigns to an STA associated therewith.

For an uplink frame, the size of the PAID field may be defined as 9 bits. For a downlink frame, the size of the PAID field may be defined as 6 bits, and the COLOR field may be defined to have a size of 3 bits. The COLOR field may be used to identify a BSS transmitting the downlink frame. For the uplink frame, a BSS transmitting the frame is identifiable using the PAID field alone, and thus the COLOR field is not included in the SIG-A field. Accordingly, the COLOR field is defined only for the downlink frame.

An STA may use the COLOR field to recognize whether or not a frame is transmitted from a BSS to which the STA belongs. For example, the STA may identify, based on the value of the COLOR field of a detected frame, whether the frame is transmitted between STAs belonging to the BSS to which the STA belongs or between STAs belonging to an overlapping BSS (OBSS). The COLOR field may have a value between 0 and 7.

The Response Indication field of Table 3 indicates the type of a response frame transmitted after an SU frame or MU frame. For example, if the value of the Response Indication field is 00, the field may indicate No Response. If the value of the Response Indication field is 01, the field may indicate an NDP response, namely, that the response frame is ACK or block ACK in the form of NDP. If the value of the Response Indication field is 10, the field may indicate Normal Response, namely that the response frame is ACK or block ACK in the form of a normal PPDU. If the value of the Response Indication field is 11, the field may indicate Long Response, namely that the response frame is a frame having the maximum MPDU size.

Although not shown in Table 3, the SIG-A field may also include an Uplink/Downlink field. The Uplink/Downlink field may explicitly indicate whether the frame is an uplink frame or a downlink frame. The Uplink/Downlink field is defined only in the SU frame. For the MU frame, the Uplink/Downlink field may not be defined. The MU frame may be preconfigured to be used only as a downlink frame.

In the MU frame, the SIG-B field may contain user-specific information as shown in FIG. 9. Table 4 below shows exemplary fields constituting the SIG-B field in the MU frame. The table also shows various exemplary parameters applied to PPDU for bandwidths (BW) of 2 MHz, 4 MHz, 8 MHz and 16 MHz.

TABLE 4

| | BW | | | |
|---|---|---|---|---|
| | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

In Table 4, the MCS field indicates an MCS value of PPDU transmitted in the form of the MU frame for each user.

The TAIL bit may be used to return the encoder set to 0.

The Cyclic Redundancy Check (CRC) field may be used for error detection in an STA receiving the MU frame.

Sectorized TXOP Operation

The present invention proposes a sectorized TXOP operation in a wireless LAN system operating in a sub-1 GHz band (e.g., a band from 902 MHz to 928 MHz).

Figure 10:
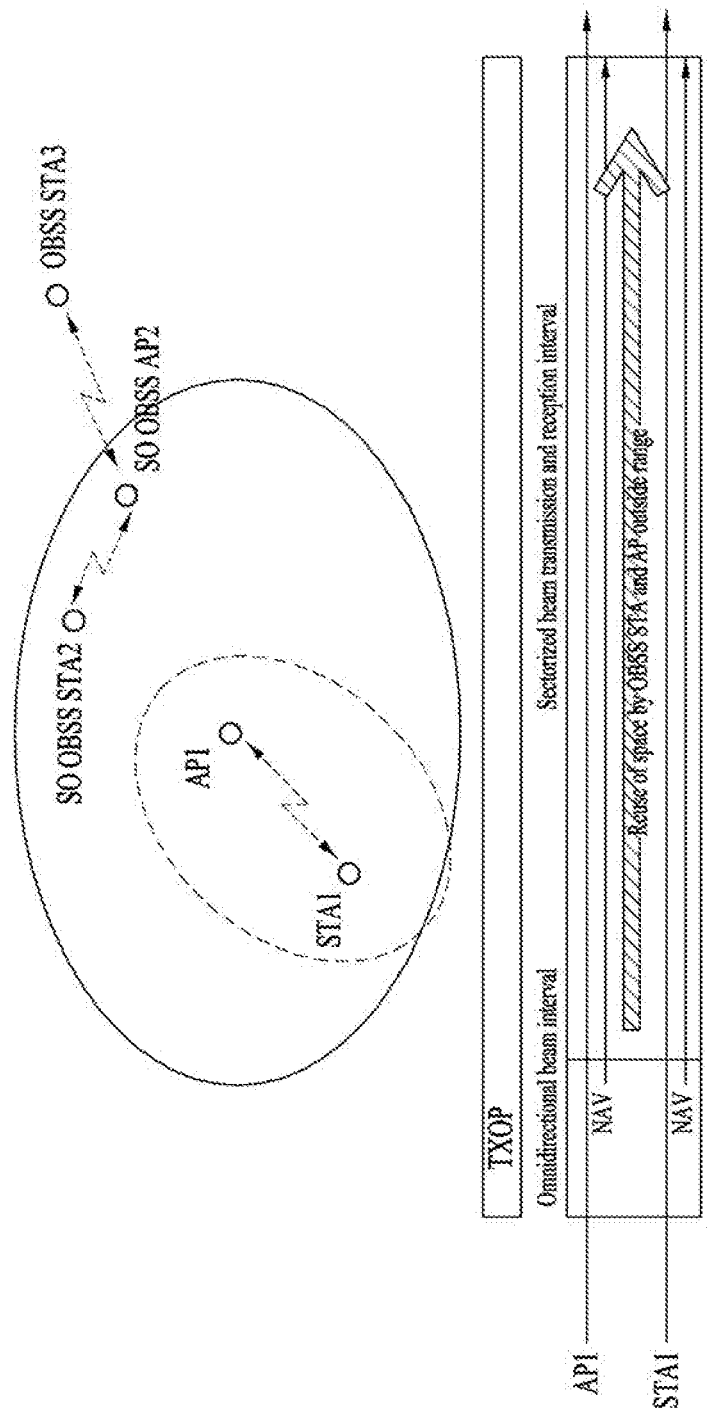
FIG. 10 illustrates an example of a sectorized TXOP operation.

FIG. 10 illustrates an example of a sectorized TXOP operation.

The sectorized TXOP operation (or TXOP-based sectorized operation) is an operation of supporting STAs belonging to different BSSs in performing transmission simultaneously in an OBSS environment by employing sectorized beam transmission. That is, STAs positioned in the intersection of different BSSs may transmit spatially orthogonal (SO) beams, thereby performing transmission simultaneously with mutual interference attenuated.

In the example of FIG. 10, it is assumed that STA1 belonging to the BSS of AP1 acquires a TXOP for communication with AP1 and performs transmission of a plurality of PPDUs within the TXOP interval. Meanwhile, AP2 of the OBSS overlapping the BSS of AP1 may perform the transmission and reception operation with STA2 and/or STA3. In FIG. 10, AP2 and STA2 are positioned in the OBSS area overlapping the BSS of APE When transmission and reception between AP2 and STA2 are spatially orthogonal (SO) to transmission and reception between AP1 and STA1, the transmission and reception operation between AP2 and STA2 and the transmission and reception operation between AP1 and STA1 may be performed simultaneously.

Specifically, AP1 and STA1 may implement an initial frame exchange sequence using an omnidirectional beam. Thereafter, AP1 and STA1 may perform transmission and reception of a plurality of PPDUs using a sectorized beam. Herein, the initial frame exchange sequence may refer to transmission and reception of RTS, CTS and the preamble portion of a long packet (e.g., STF, LTF1 and SIG-A of FIG. 9) or transmission and reception of RTS, CTS and the first short packet (or the first NDP frame).

Thereby, while AP1 and STA1 are performing transmission and reception of a plurality of PPDUs within the TXOP interval using a sectorized beam, other entities belonging to the OBSS (e.g., AP2, STA2, and STA3) may perform channel access within the interval (i.e., the sectorized beam transmission and reception interval). This operation may be enabled only when transmission and reception between AP1 and STA1 using the sectorized beam do not apply an interference signal to other entities.

Figure 11:
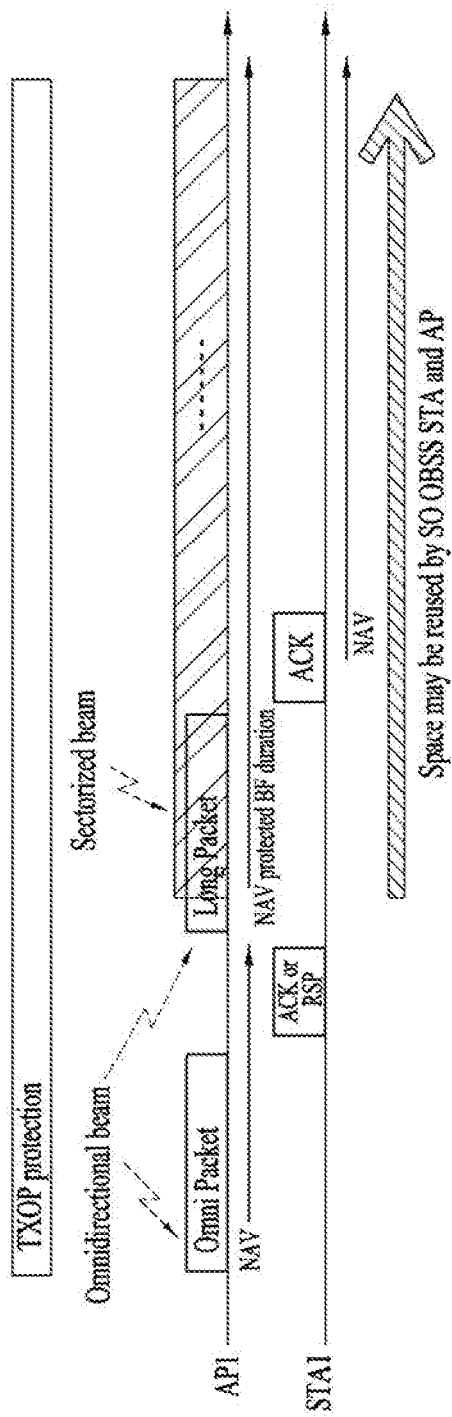
FIGS. 11 and 12 illustrate an exemplary spatial orthogonality (SO) condition under which a sectorized TXOP is allowed.
Figure 12:
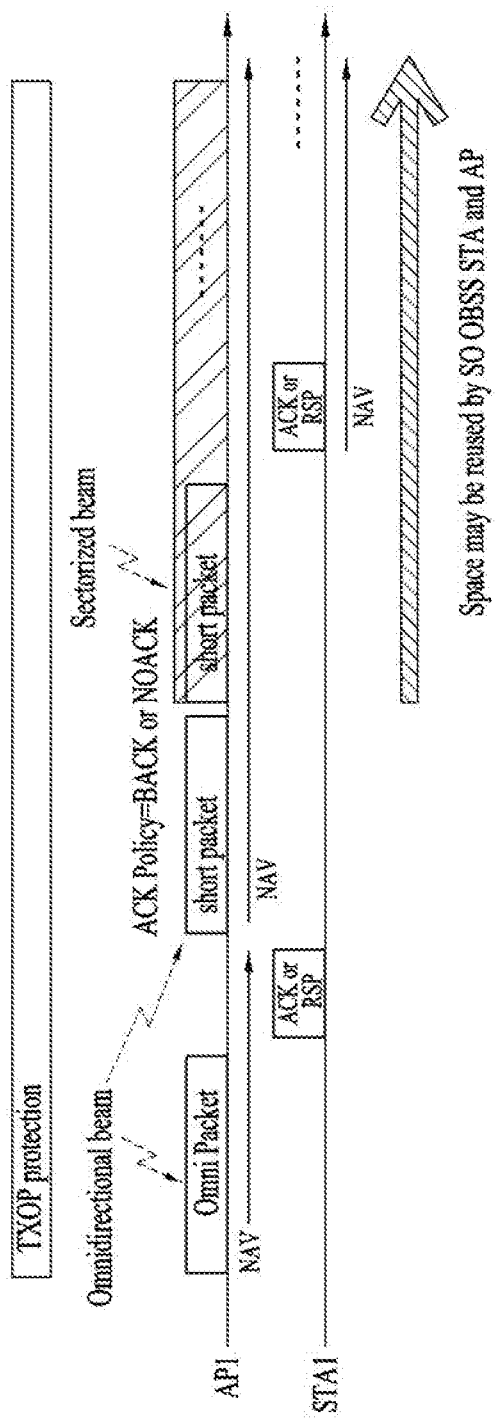

FIGS. 11 and 12 illustrate an exemplary spatial orthogonality (SO) condition under which a sectorized TXOP is allowed.

In the example of FIGS. 11 and 12, AP1 transmits an omnidirectional beam to allow the STAs belonging to the BSS of AP1 to configure NAVs. STA1 receiving an omini packet transmitted from AP1 may transmit ACK or a response frame. Then, neighboring STAs may configure NAVs by detecting the ACK or the response frame transmitted by STA1. In addition, AP1 may transmit PPDU through sectorized beam transmission. The PPDU transmitted by AP1 may be a long packet as shown in FIG. 11 or a short packet (NDP frame) as shown in FIG. 12.

In the case of the long packet as shown in FIG. 11, the preamble portion may be transmitted using an omnidirectional beam, and the other portions and the subsequent PPDUs may be transmitted using a sectorized beam. In the case of short packets as shown in FIG. 12, the first short packet may be transmitted using an omnidirectional beam, and the other subsequent short packets including the second short packet may be transmitted using a sectorized beam.

In this case, other STAs may receive a portion corresponding to the omnidirectional beam transmission, but may fail to detect/receive a portion corresponding to the sectorized beam transmission. For example, if an AP or non-AP STA (e.g., AP2 or STA2) belonging to an OBSS receives omnidirectional beam transmission from another entity (e.g., AP1 or STA1) participating in frame exchange, but fails to detect subsequent sectorized beam transmission (this situation is called a situation satisfying the "SO condition"), the AP or non-AP STA belonging to the OBSS may reset an NAV value set by the omnidirectional beam transmission (e.g., setting the value to 0), and perform channel access within the corresponding TXOP interval. Failing to detect sectorized beam transmission means that a valid OFDM symbol has not been received. This situation may result from many factors such as misalignment of the sectorized beam with the position of the corresponding STA. For example, if the values of the Received Signal Strength Indicator (RSSI) and the Received Channel Power Indicator (RCPI) are less than or equal to a predetermined threshold, it may be determined that a valid OFDM symbol has not been received (or sectorized beam transmission has not been detected).

In the case of the legacy system which does not support the TXOP-based sectorized operation, if an error is caused by signal loss before reception of a PSDU is completed in a structure such as the Sub-1 GHz (S1G) PHY preamble structure of FIG. 9 which sequentially includes omnidirectional beam transmission and sectorized beam transmission, the PHY-RXEND.indication(CarrierLost) primitive indicating an error condition is reported from PHY to MAC. Thereafter, PHY calls the PHY-CCA.indication(IDLE) primitive after waiting until the expected transmission time of PSDU, and then shifts to the RX IDLE state.

However, if signal loss is caused by the TXOP-based sectorized operation, the STA may use a channel without waiting until the expected transmission time of PSDU reaches, and accordingly efficiency of utilization of system resources may be enhanced. For example, in the case of a system supporting the TXOP-based sectorized operation, if the PHY reports the PHY-RXEND.indication(CarrierLost) primitive to the MAC, and the SO condition is met, the STA may immediately reset the CCA status machine (e.g., calling the PHY-CCARESET.request primitive through the PHY) and perform channel access without waiting until the expected transmission time of the PSDU of the corresponding frame reaches.

Sectorized NAV Update Technique

In order to more efficiently support the proposed sectorized TXOP operation (or TXOP-based sectorized operation) described above, it is proposed that a sectorized NAV update technique for supporting NAV resetting of STAs be used when the SO condition is met.

The sectorized NAV update technique is applied only to the OBSS STAs. That is, for PPDU transmission performed within a BSS to which an STA belongs, the STA adopts a normal NAV update method. For example, if NAV update is not implemented through OBSS transmission with the SO condition met, resetting the NAV is not allowed in consideration of the sectorized TXOP operation.

To this end, STAs may configure a new sectorized NAV in addition to the existing NAV (referred to as the legacy NAV). The value of a sectorized NAV may be updated by a PPDU through OBSS transmission. Specifically, an STA may set/update the legacy NAV value for a PPDU transmitted from another STA or an AP belonging to the BSS thereof, and set/update the sectorized NAV value for a PPDU transmitted from an STA or an AP belonging to OBSS.

If the SO condition is met, the STA may reset the sectorized NAV value alone, and may not reset but maintain the legacy NAV value. Thereby, if TXOP of another STA/an AP belonging to the BSS of the STA is being used, the STA may prevent the NAV from being reset due to the sectorized TXOP operation to perform channel access, and protect the TXOP which is being used in the BSS.

If an STA configures/uses both the legacy NAV and the sectorized NAV as described above, the STA may determine that a channel is idle in the virtual carrier sensing (VCS) procedure of the STA only when both the legacy NAV and the sectorized NAV are idle. In other words, if any one of the legacy NAV and the sectorized NAV is not idle, the STA determines that the channel is not idle.

Additionally, when a plurality of OBSSs exists, one sectorized NAV may be configured/updated without distinguishing among the OBSSs. Alternatively, a plurality of sectorized NAV values may be defined and set/updated for respective OBSSs. In this case, if the SO condition is met, NAV resetting may be more precisely performed. In addition, if all sectorized NAVs including the legacy NAV are idle, the STA determines that the channel is idle in the VCS procedure thereof. If any one of the sectorized NAVs is not idle, the STA determines that the channel is not idle.

Identification of Frame Exchange of BSS or OBSS

To support the proposed operations of the present invention (including examples described above and below), it is necessary to identify whether a PPDU received by an STA is communicated between STAs belonging to the same BSS or between STAs belonging to OBSS. To this end, the STA may identify/determine whether the frame exchange is performed in the BSS of the STA or in another BSS (e.g., OBSS), based on the PAID value contained in the SIG-A field of the Sub-1 GHz (S1G) PHY preamble of FIG. 9.

The PAID value of an uplink frame is calculated/set based on a part of the BSSID value, while the value of PAID of a downlink frame (or a direct link setup (DLS) frame or a tunneled DLS frame) is calculated/determined based on a part of the AID value of a reception STA and a part of the BSSID value. For the downlink frame, a COLOR bit for identifying a BSS may be used.

Thereby, if a received PPDU is an uplink frame, the STA may identify/determine whether the frame is from the BSS to which the STA belongs or from another BSS (e.g., OBSS) by comparing the PPDU with the BSSID of the BSS to which the STA belongs.

If the PPDU that the STA has received is a downlink frame, the STA may identify/determine whether the frame is from the BSS to which the STA belongs or from another BSS (e.g., OBSS) by comparing the PPDU with the COLOR bit of the BSS to which the STA belongs. If the COLOR bit is defined to have 3 bits, the STA may distinguish among a maximum of 8 different BSSs.

Sectorized NAV-Based TXOP Truncation

In updating NAVs, an STA may update a legacy NAV for frame exchange between STAs belonging to the BSS to which the STA belongs, and update a sectorized NAV for frame exchange between STAs belonging to a BSS (e.g., OBSS) different from the BSS to which the STA belongs. Thereby, the STA may more accurately perform VCS.

For example, when an STA configures/updates NAVs separately for the BSS to which the STA belongs and another BSS (e.g., OBSS), the STA may perform TXOP truncation for each BSS.

A CF-END frame is defined in order to reset NAVs of all STAs. Upon receiving the CF-END frame, an STA needs to reset the current NAV value (e.g., setting the value to 0) and stop the operation of the NAV timer. If the STA having acquired a TXOP has no more DATA frame to transmit, the STA may transmit a CF-END frame to reset NAVs of other STAs to allow other STAs to have an opportunity to use the channel and attempt channel access.

If the STA is configured to set/update the NAV values for the BSS and the OBSS respectively, the STA may have a problem in determining an NAV to reset when the STA receives a CF-END frame. In this case, if the STA confirms, through the PAID value in the SIG-A field of the Sub-1 GHz (S1G) PHY preamble, that the CF-END frame is transmitted from another STA belonging to the BSS of the STA, the STA may reset only the legacy NAV, and maintain the sectorized NAV value(s) of the other OBSS(s) rather than resetting the sectorized NAV value(s). If the STA confirms, through the PAID value of the received CF-END frame, that the CF-END frame is transmitted from an STA belonging to an OBSS, the STA may reset only the sectorized NAV value corresponding to the OBSS, and maintain the legacy NAV value for the BSS thereof (a sectorized NAV value for another old BSS, if present) rather than resetting the legacy NAV value.

The method of setting/updating NAV for each BSS/OBSS as described above may increase complexity and cost of implementation of an STA. If the COLOR bit in the PAID field of the received frame is defined to have 3 bits, up to 8 BSSs/OBSSs may be distinguished in a downlink frame. That is, the STA may distinguish between and set/update a maximum of 8 NAVs for BSSs/OBSSs.

For the uplink frame, the COLOR bit is not included in the frame, and thus the STA needs to pre-confirm and accumulate the COLOR bit in the PAID field and the Transmitter Address (TA) field of the MAC header of a separate downlink frame rather than the uplink frame and pre-store a mapping relationship between the TA and the COLOR bit (in the form of, e.g., a mapping table). Since this operation may increase complexity of the STA operation, only one NAV value may be set and updated for all frames belonging to the OBSS to facilitate implementation of the STA.

Alternatively, it is proposed that a COLOR object be included in the PAID field of the uplink frame. In this case, a BSS/OBSS in which a frame has been transmitted may be identified regardless of whether the frame is a downlink frame or an uplink frame, and an NAV may be set/updated for each BSS/OBSS. In other words, the COLOR bit may be included in the PAID field of the SIG-A field in both the uplink frame and the downlink frame, and NAVs may be set and managed based on the value of the COLOR bit. If an STA receives a CF-END frame, the STA may identify whether the frame has been transmitted in a BSS/OBSS, based on the COLOR bit included in the preamble of the CF-END frame, and reset only the NAV value (legacy NAV value or sectorized NAV value) for the corresponding BSS or OBSS.

TXOP-Based Sectorized Operation Using One NAV

In contrast with the examples described above, if it is not possible to implement a legacy NAV and one or more sectorized NAVs due to restrictions such as complexity and costs of implementation of STAs, one NAV may be used to implement the TXOP-based sectorized operation.

Specifically, the TXOP-based sectorized operation may be correctly implemented when the operation is limited to a case where the TXOP is not used in the BSS of an STA. For example, if there is no TXOP which is being used in the BSS to which an STA belongs, and as a result, an NAV is not set, NAV update may be performed through OBSS transmission. If the OBSS transmission satisfies the SO condition (namely, if the STA receives an omnidirectional beam portion, but fails to detect a subsequent sectorized beam portion), the STA may reset the NAV. On the other hand, if there is a TXOP which is being used in the BSS to which an STA belongs, and as a result, an NAV is set, the STA may not reset the NAV even if OBSS transmission satisfies the SO condition.

If an STA resets the NAV without distinguishing frame exchange in the BSS to which the STA belongs from frame exchange in another BSS (e.g., OBSS) when the SO condition is met, the STA may fail to correctly protect the TXOP in the BSS thereof. Accordingly, NAV resetting (i.e., corresponding channel access) is preferably performed only when the SO condition is met for frame exchange in another BSS (e.g., OBSS).

VCS Based on Response Indication Field

In the examples of the present invention given above, performing virtual carrier sensing (VCS) based on NAVs has been mainly described. However, the scope of the present invention is not limited thereto. The present invention covers a case where VCS is performed based on other information.

For example, as described in Table 3, the SIG-A field of the Sub-1 GHz (S1G) PHY preamble includes a Response Indication field indicating the type of a response frame.

If there is an error in the MPDU of a frame received by an STA, the value of the Duration field of the MAC header cannot be checked. If the value of the Duration field cannot be checked, and NAVs cannot be configured because the NAV value is determined based on the value of the Duration field of the received frame.

However, if an STA can recognize, through the Response Indication field included in a frame received by the STA, the type of a response frame which (another) STA will transmit for the received frame, the STA may predict the value of the Duration field included in the MPDU MAC header even if the STA fails to check the value of the Duration field due to an error in the MPDU of the received frame.

For example, if the Response Indication field of the received frame indicates No Response, the STA may expect that the value of the Duration field of the MAC header of the received frame is 0.

If the Response Indication field of the received frame indicates NDP Response, the STA may expect that the value of the Duration field of the MAC header of the received frame is the sum of the PLCP header transmission time and the SIFS (PLCP header transmission time plus SIFS) (wherein the PLCP header transmission time corresponds to the length of STF, LTF, and SIG fields).

If the Response Indication field of the received frame indicates Normal Response, the STA may expect that the value of the Duration field of the MAC header of the received frame is the sum of the ACK/BACK (Block ACK) PPDU transmission time and the SIFS (ACK/BACK PPDU transmission time plus SIFS).

If the Response Indication field of the received frame indicates Long Response, the STA may expect that the value of the Duration field of the MAC header of the received frame is the sum of a maximum PPDU transmission time for protecting any response frame and the SIFS (MAX_PPDU transmission time plus SIFS).

As described above, an STA detecting/receiving a frame may perform protection of a current TXOP through the Response Indication field included in the SIG-A field of the PLCP header of the frame (even if there is an error in the MPDU of the frame).

FIG. 13 is a diagram illustrating a VCS scheme using a Response Indication field.

In FIG. 13, if a normal ACK frame is transmitted in response to a data frame, the Response Indication field of the SIG-A field of the PLCP header in the data frame may be set to a value (e.g., 10) indicating Normal Response. An STA receiving the data frame may recognize, from the Response Indication field in the SIG-A field of the PLCP header, the type (Response Frame Type) of a response frame to be transmitted (by another STA) in response to the data frame. A third-party STA receiving a frame in which the Response Indication field is set to a value indicating Normal Response (i.e., an STA overhearing the frame other than the receiver which the frame is intended for) may defer channel access by setting VCS in the busy state for a predetermined duration according to the response frame type expected at the time when the PSDU of the received frame is completed. This operation may be referred to as response indication deferral (RID).

In the case where the TXOP-based sectorized operation is performed as in the examples of the present invention, if an error is generated while an STA is receiving a frame (e.g., the MAC of the STA is receiving a report on a PHY- RXEND.indication(CarrierLost) primitive from the PHY), and the SO condition is met (namely, if the STA receives omnidirectional beam transmission, but fails to receive subsequent sectorized beam transmission), the STA may immediately call the PHY for the PHY-CCARESET.request primitive and perform channel access without waiting until the expected PSDU transmission time of the frame reaches. To this end, if the SO condition is met, VCS using the Response Indication field of the SIG-A field of the PLCP header needs to be stopped. That is, if CCA is reset to the idle state before the expected PSDU transmission time of the frame received by a third-party STA, VCS utilizing the Response Indication field may also be stopped. On the other hand, channel access may be deferred by setting VCS to the busy state for a predetermined duration according to the expected response frame type only if CCA is in the busy state at the time when the PSDU of the frame that the third-party STA is receiving is completed.

According to the TXOP-based sectorized operation of the present invention, if ongoing frame exchange is transmitted in a BSS (e.g., OBSS) different from the BSS to which the STA belongs, the STA may reset the VCS value (e.g., NAV value or RID value) when the SO condition is met (i.e., when the STA receives an omnidirectional beam, but fails to receive a subsequent sectorized beam). If ongoing frame exchange is transmitted in the BSS to which the STA belongs, the VCS value (e.g., NAV value or RID value) should not be reset even if the SO condition is met.

Figure 14:
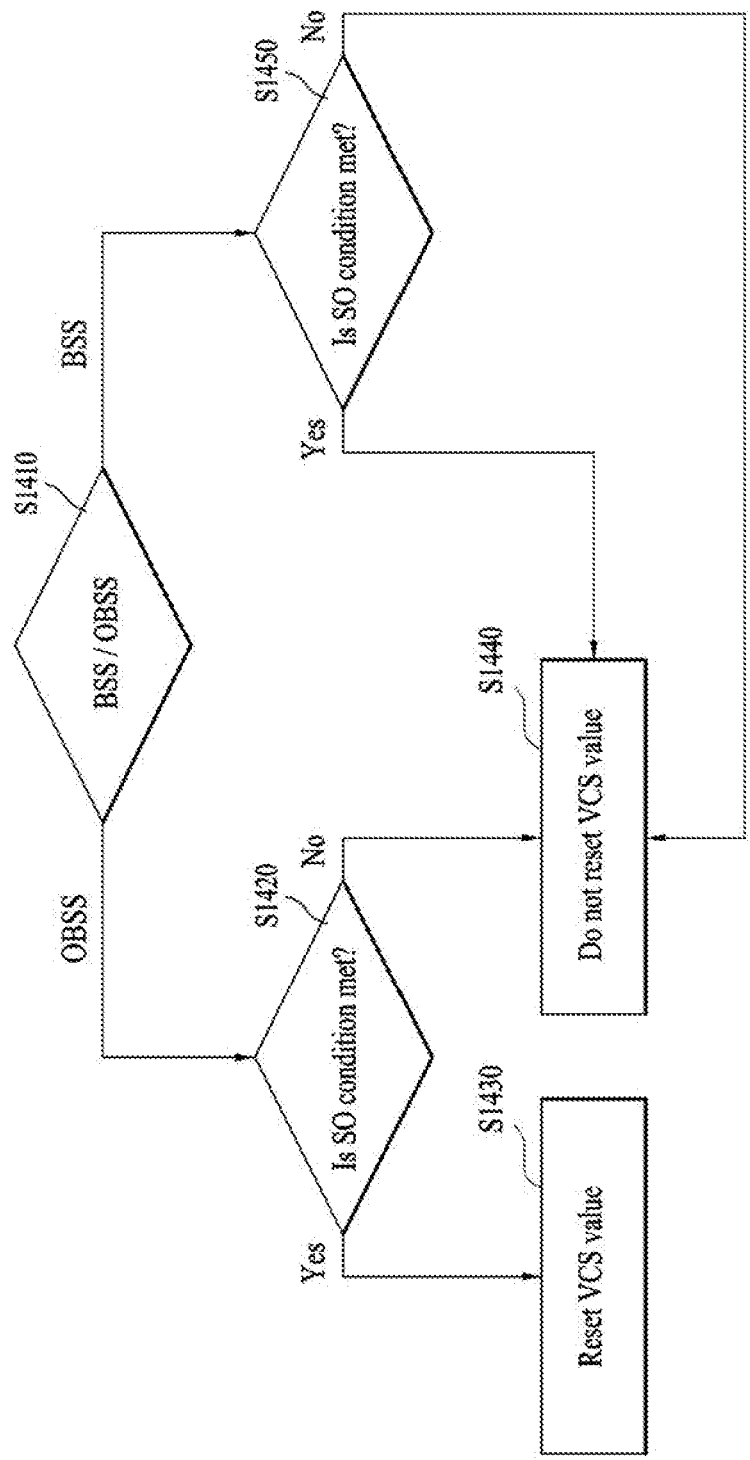
FIG. 14 is a diagram illustrating a method according to an embodiment of the present invention.

FIG. 14 is a diagram illustrating a method according to an embodiment of the present invention.

In step S1410, an STA may determine whether the ongoing frame exchange is transmitted in the BSS to which the STA belongs or an OBSS.

In step S1420, if frame exchange occurs in the OBSS different from the BSS to which the STA belongs, it is determined whether the SO condition is met (e.g., whether the STA receives an omnidirectional beam, but fails to receive a subsequent sectorized beam). If it is determined in step S1420 that the SO condition is met, the STA may reset the VCS value in step S1430. Thereby, the STA may attempt to perform channel access.

If it is determined in step S1420 that the SO condition is not met, the STA may not reset the VCS value in step S1440, but defer channel access according to the VCS value.

If it is determined in step S1410 that frame exchange is performed within the BSS, the STA may proceed to step S1450 to determine whether the SO condition is met. Even if it is determined in step S1450 that the SO condition is met, the STA operates not to reset the VCS value according to step S1440. Similarly, if it is determined in step S1450 that the SO condition is not met, the STA operates not to reset the VCS value according to step S1440.

Alternatively, step S1450 may be omitted, and if ongoing frame exchange is transmitted within the BSS, the STA may operate not to reset the VCS value.

The exemplary method illustrated in FIG. 14 is expressed as a series of operations for simplicity of description, but is not intended to limit the order of the steps. When necessary, the steps may be performed simultaneously or in a different order. In addition, not all steps illustrated in FIG. 14 are needed to implement the proposed method.

In the frame transmission and reception method (particularly, the method for configuring PAID) of the present invention illustrated in FIG. 14, the details described in various embodiments of the present invention may be independently applied or implemented such that two or more embodiments are simultaneously applied.

Figure 15:
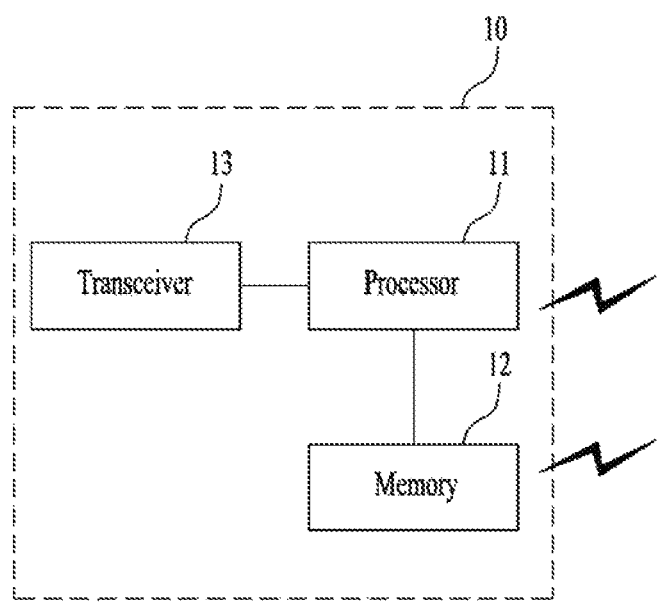
FIG. 15 is a block diagram illustrating configuration of a radio frequency apparatus according to an embodiment of the present invention.

FIG. 15 is a block diagram illustrating configuration of a radio frequency apparatus according to an embodiment of the present invention.

STA 10 may include a processor 11, a memory 12 and a transceiver 13. The transceiver 13 may transmit/receive a radio signal, and implement a physical layer according to, for example, the IEEE 802 system. The processor 11 may be connected to the transceiver 13 to implement a physical layer and/or MAC layer according to the IEEE 802 system. The processor 11 may be configured to perform operations according to various embodiments of the present invention described above. In addition, a module for implementing the operation of the STA according to various embodiments of the present invention described above may be stored in the memory 12 and executed by the processor 11. The memory 12 may be included in the processor 11 or may be installed outside the processor 11 and connected to the processor 11 through a well-known means. The STA 10 of FIG. 15 may be an AP STA or a non-AP STA.

The processor 11 of the STA 10 may determine whether the ongoing frame exchange detected through the transceiver 13 is transmitted in the BSS to which the STA 10 belongs or another BSS. Additionally, the processor 11 may determine whether the SO condition is met. Only if frame exchange is transmitted in the OBSS and the SO condition is met, may the processor 11 reset the VCS value, and may the STA 10 attempt to perform channel access using the transceiver 13. If any one of the condition of transmission in the OBSS and the SO condition is not met, the processor 11 should not reset the VCS value but defer channel access of the STA 10 according to a predetermined value.

The specific configuration of the STA described above may be implemented such that the above-described embodiments can be independently applied or two or more thereof can be simultaneously applied, and description of redundant parts is omitted for clarity.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Various embodiments of the present invention have been described through an IEEE 802.11 system, but they may also be applied to various mobile communication systems.

The invention claimed is:

1. A method of performing, by a station, STA, a transmission opportunity-based, TXOP-based, sectorization operation in a wireless LAN system, the method comprising:
   determining whether an ongoing frame exchange is transmitted within a basic service set, BSS, of the STA or within an overlapping BSS, OBSS, based on a COLOR bits value which is included in a downlink frame within the ongoing frame exchange,
   wherein the COLOR bits value is further used to distinguish a plurality of OBSS s of the wireless LAN system;
   determining whether spatially orthogonal, SO, conditions are met; and
   resetting a virtual carrier sensing, VCS, value of the STA, if the ongoing frame exchange is transmitted within the OBSS and the SO conditions are met.

2. The method of claim 1, wherein the VCS value of the STA is not reset, if at least one of the ongoing frame exchange is not transmitted within the OBSS or the SO conditions are not met.

3. The method of claim 1, wherein the SO conditions are met, if the STA receives an omnidirectional beam but not a subsequent sectorized beam transmission.

4. The method of claim 1, wherein the VCS value corresponds to a NAV (Network Allocation Vector) or a RID (Response Indication Deferral).

5. The method of claim 1, wherein the VCS value is configured based on information received within the ongoing frame exchange.

6. The method of claim 1, wherein a channel access by the STA is deferred according to the VCS value, if the VAS value is not reset.

7. The method of claim 1, wherein the resetting of the VCS value corresponds to setting the VCS value as 0.

8. A station, STA, performing opportunity-based, TXOP-based, sectorization operation in a wireless LAN system, the STA comprising:
   a transceiver; and
   a processor configured to:
   determine whether an ongoing frame exchange is transmitted within a basic service set, BSS, of the STA or within an overlapping BSS, OBSS, based on a COLOR bits value which is included in a downlink frame within the ongoing frame exchange,
   wherein the COLOR bits value is further used to distinguish a plurality of OBSS s of the wireless LAN system,
   determine whether spatially orthogonal, SO, conditions are met; and
   reset a virtual carrier sensing, VCS, value of the STA, if the ongoing frame exchange is transmitted by the transceiver within the OBSS and the SO conditions are met.

* * * * *